United States Patent [19]

McCartney

[11] Patent Number: 4,854,664
[45] Date of Patent: Aug. 8, 1989

[54] MULTI-FIBER OPTIC CABLE CONNECTOR AND CABLE APPARATUS

[75] Inventor: Ronald L. McCartney, Orange, Calif.

[73] Assignee: Rockwell International Corporation, El Segundo, Calif.

[21] Appl. No.: 44,087

[22] Filed: Nov. 17, 1986

[51] Int. Cl.[4] .................................................. G02B 6/40
[52] U.S. Cl. ................................ 350/96.22; 350/96.21
[58] Field of Search ............... 350/96.20, 96.21, 96.22, 350/96.23

[56] References Cited

U.S. PATENT DOCUMENTS

| | | | |
|---|---|---|---|
| 3,910,678 | 10/1975 | McCartney et al. | 350/96 C |
| 3,914,015 | 10/1975 | McCartney | 350/96 C |
| 3,936,145 | 2/1976 | McCartney | 350/96.22 |
| 4,021,098 | 5/1977 | McCartney et al. | 350/96 C |
| 4,056,305 | 11/1977 | McCartney et al. | 350/96 C |
| 4,172,746 | 10/1979 | Le Noane et al. | 350/96.22 X |
| 4,190,317 | 2/1980 | Makuch | 350/96.20 |
| 4,193,665 | 3/1980 | Arnold | 350/96.22 |
| 4,203,650 | 5/1980 | Millet et al. | 350/96.21 |
| 4,253,730 | 3/1981 | Logan et al. | 350/96.21 |
| 4,354,731 | 10/1982 | Mouissie | 350/96.2 X |
| 4,365,865 | 12/1982 | Stiles | 350/96.23 |
| 4,406,515 | 9/1983 | Roberts | 350/96.21 |
| 4,493,529 | 1/1985 | Doty | 350/96.20 |
| 4,541,685 | 9/1985 | Anderson | 350/96.21 |
| 4,712,864 | 12/1987 | Ellis et al. | 350/96.22 |

FOREIGN PATENT DOCUMENTS

| | | |
|---|---|---|
| 0091253 | 10/1983 | European Pat. Off. . |
| 0109149 | 5/1984 | European Pat. Off. . |
| 2532209 | 2/1977 | Fed. Rep. of Germany . |
| 3129370 | 2/1983 | Fed. Rep. of Germany ... 350/96.20 |

OTHER PUBLICATIONS

Fiber Optics, Scientific American, vol. 203, pp. 72-81, Nov. 1960, Narinder S. Kapany.
Measurements of Loss Due to Offsets and End Separations of Optical Fibers, Bell System Tech. Journal, vol. 50, No. 10, pp. 3159-3168, D. L. Bisbee, Dec. 1971.
Effect of Misalignments on Coupling Efficiency of Single-Mode Optical Fiber Butt Joints, Bell System Technical Journal, vol. 52, No. 8, pp. 1439-1448, Oct. 1973, J. S. Cook et al.
Optical Fiber Joining Technique, Bell System Technical Journal, vol. 50, No. 10, pp. 3153-3158, Dec. 1971, D. L. Bisbee.
Conference Record, vol. 2 of 3, Integrating Communication for World Progress, Boston, Mass., 19-22, Jun. 1983; M. Hirai et al.: "Optical FIber Cables for Local Area Network", pp. 707-712.
Electronic Design, vol. 26, No. 22,25, Oct. 1978; R. L. Warkentine: "To terminate plastic-clad silica fibers, first strip and reclad the ends", pp. 118-119.

*Primary Examiner*—John D. Lee
*Attorney, Agent, or Firm*—H. Fredrick Hamann; George A. Montanye; Tom Streeter

[57] ABSTRACT

An apparatus for aligning and terminating at least one optical fiber of a fiber optic cable within the fiber optic connector assembly aong a predetermined axis. The fiber optic connector comprises a rigid tubular body having a bore dimensioned for receiving the fiber optic cable, a central axis concentric with the predetermined axis, a split alignment sleeve having an outer dimension greater in dimension than the bore of the rigid tubular body, and a threaded alignment sleeve holder having a central aperture dimension for receiving the rigid tubular body and the compressible split alignment sleeve. The apparatus further includes a compression pin which is inserted into the forward end of the fiber optic connector to concetrically align and separate the fibers of the fiber optic cable.

30 Claims, 12 Drawing Sheets

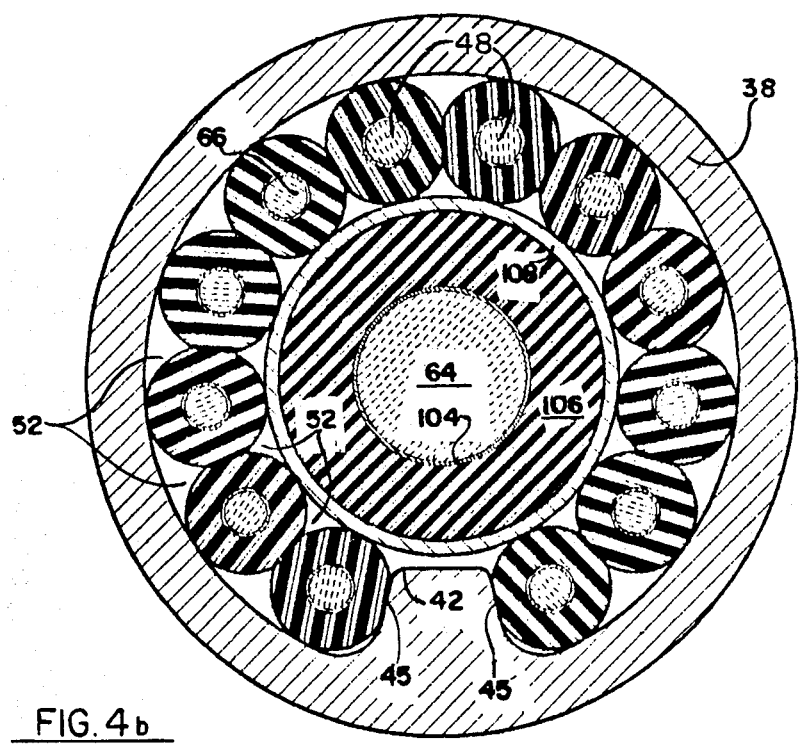
FIG. 4b
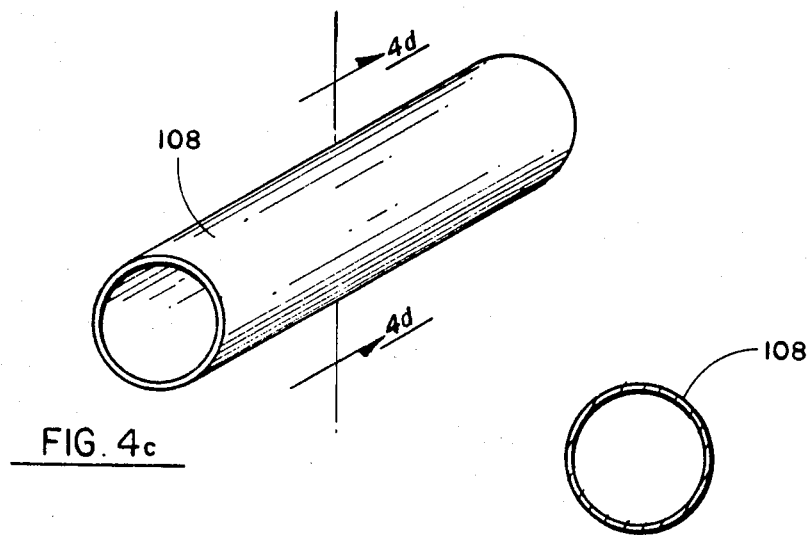
FIG. 4c
FIG. 4d

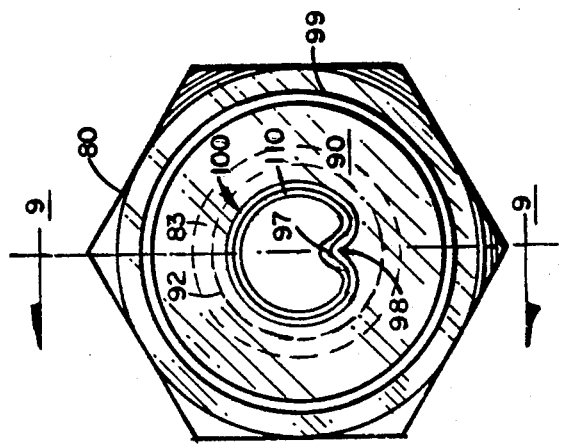
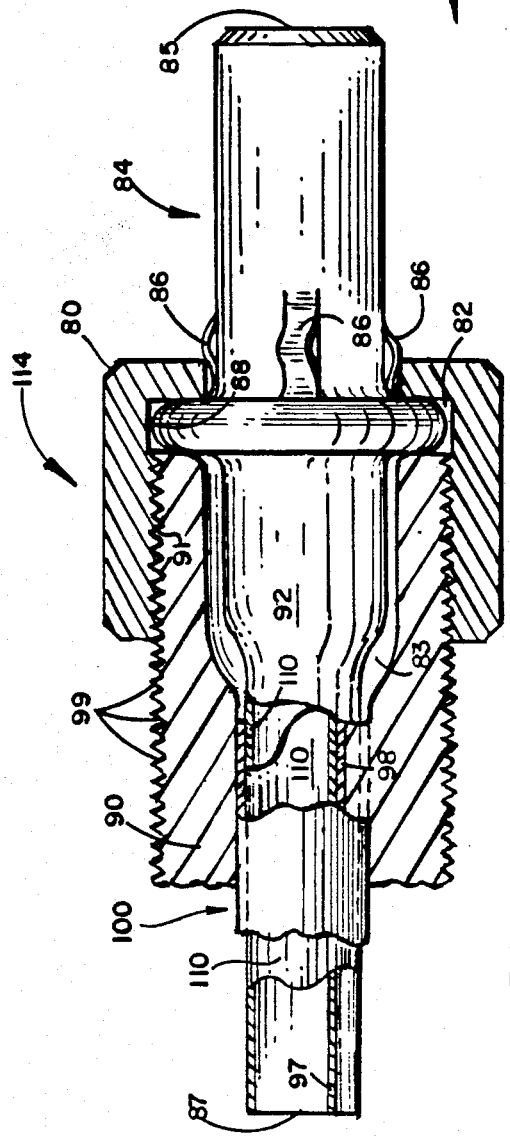
FIG. 9
FIG. 10

MULTI-FIBER OPTIC CABLE CONNECTOR AND CABLE APPARATUS

BACKGROUND OF THE INVENTION

1. Field of the Invention

The present invention relates generally to connectors for fiber optic cables, more specifically, to an optical connector for interconnecting multi-fiber optic cables.

2. Description of the Prior Art

The utilization of fiber optic cables or light guides, also sometimes referred to as optical communication fibers, for the transmission of information bearing light signals, is an established art. An article entitled "Fiber Optics," by Narinder S. Kapany, published in Scientific American, Vol. 203, pages, 72–81, November 1960, provides a useful background with respect to some theoretical and practical aspects of the use of fiber optic cables and connectors.

As evidenced by the preceding article, a great deal of development has been devoted to the provision of practical low-loss glass materials and production techniques for producing glass fiber cables with protective outer claddings or jackets. Presently used cables resemble bulky metallic core electrical cables and are not yet practical for use in volume and weight critical signal transmission and processing systems.

In addition to the volume and weight considerations, prior art mateable connectors that utilize either single or multiple fiber cables are subject to optical transfer losses caused by several factors including but not limited to: traverse displacements, excessive axial gap distances, axial misalignment, broken fibers, reflective losses, chips or scratched mating surfaces, and for multiple fiber bundles, low density fiber packing. Multiple fiber cable optical losses have been minimized by consolidating the fiber optic bundle to produce a closed pack array, leaving only the spaces between the adjacent fibers and the fiber cladding as lost optical area. Traverse displacements caused by excess tolerances of the contact/alignment socket fit, concentricity deviations of the contacts terminating the optic bundles, and individual fiber bundle diameter variations all result in light transmission losses. Concentricity deviations, and rotational misalignments, even when the contacts are keyed to each other, typically cause enough misalignment between fiber bundles to effectively randomize the mated fiber alignment and, thus, cause light transmission losses.

The importance of transfer efficiency cannot be under estimated and a useful overview of the subject can be found in the Bell System Technical Journal, Vol. 50, No. 10, pages 3159–3168, December 1971, specifically to an article by D. L. Bisbee, entitled, "Measurement of Loss Due to Offsets and End Separations of Optical Fibers." Another Bell System Technical Journal article of further interest appeared in Vol. 52, No. 8, pages 1439–1448, October 1973, and was entitled, "Effect of Misalignments on Coupling Efficiency on Single Mode Optic Fiber Butt Joints," by J. S. Cook, W. L. Mammel and R. J. Grow.

Transmission efficiency has had a direct bearing on the types, arrangements and selection of optic fibers and connectors for particular uses. For example, fiber Optic bundles are normally utilized only for short transmission distances in fiber optic communications networks. On the other hand, fibers are used individually as optical data channels to allow transmission over many kilometers. Some fiber optic cables utilize multi-fiber bundles due to the less stringent splicing requirements, a greater inherent redundancy, and a higher signal to noise ratio.

Multi-channel connectors typically align from two to possibly twenty fiber optic channels. These connectors can terminate both electrical and fiber optic cable simultaneously and generally utilize what is known as an electrical connector housing. Present multi-channel fiber optic connectors or fiber optic and electrical connectors are designed so that there is generally very little room within the connector housing to accommodate malfunctions associated with broken fibers which require retermination of a fiber. This difficulty is generally not a problem in electrical lines since wires generally do not crack or break. However, in fiber optic lines, if a fiber is broken it must be reterminated which generally requires removing an inch or two of a fiber. This removal in turn shortens the fiber, thereby resulting in a distorted fiber cable system.

Fiber shortening also does not lend itself to a convenient wrapping or laying of a fiber cable system at a connector cable junction. Furthermore, even if the fibers have been properly terminated so that there is no cable distortion, each one of the separate fiber optic channels must be protected and cleaned so that there will be no problems associated with the interconnection of fibers to fibers in the mated connector. In essence, what has occurred by properly protecting and isolating each one of the fiber optic contacts is that the connector has become as large as an electrical connector, thereby reducing the desirability of the use of multi-fiber optic connectors.

Another often used type of fiber optic connector is a single channel fiber optic connector. A typical single channel fiber optic connector consists of a shell for holding the fiber optic contact into position against an opposing mating fiber optic contact. This often used fiber optic connector is known as an "SMA" type of fiber optic connector. The "SMA" connector is commercially available from several companies such as Amphenol Corporation, 2122 York Road, Oak Brook, Il. 60521, and from Optical Fiber Technologies, Inc., P.O. Box 148, Nutting Lake, Mass. 01865.

The applications for single channel fiber optic connectors are primarily in areas requiring the disassembly of one channel without disturbing other channels. For example, single channel connectors are used in many industrial and commercial applications, such as building management, machine management, as well as in other communication areas where it is not desirable to have the whole communication system down when repairing just one channel.

A major disadvantage of using present art multi-channel fiber optic connector systems is that in order to repair a damaged contact, every optical contact housed in the connector must normally be reterminated. Another difficulty with multi-channel connector systems is that the termination of a cable having several fibers, requires the addition of a fiber optic contact on each one of these fibers, the polishing of each fiber, and then the fitting each fiber into a multi-channel or single channel contact. This process is very time consuming, especially if a twenty channel cable is involved. Regardless of whether a multi-channel connector or several single channel connectors must be terminated, the result is that an excessive amount of weight and physical volume is required at the connector junctions.

Heretofore, the problem of having large connectors for the termination of multi-channel fiber optic cable has been one of the detriments to the use of fiber optics. The rational being that a very small fiber optic sensor containing several fibers, also requires a large connector to properly interconnect the sensor. This dichotomy of sizes is inconsistent with the beneficial aspects of using the small fiber optic sensor. More specifically, the use of small, light weight connector assemblies on aircraft is very critical due to the space and weight design constraints that typically exist. Presently, single channel connectors, and multiple single channel connectors imply a large amount of weight, especially, when using several fiber optic cables. More particularly, within the area of an aircraft, large connector assemblies reduce the spare volume for installing other equipment due to the multitude of single channel connectors which utilize a great deal of room. Consequently, fiber optic technology is not yet convenient in weight and volume critical applications Hence, the practical use of connectors is foregone in these weight and volume critical areas, and the full benefits of fiber optic technology remains untapped.

From the foregoing, the need should be appreciated for a smaller, lighter, multi-channel, multi-fiber optic coherent bundle connector for multi-channel transmission, or what is presently called a multi-fiber single contact connector. Accordingly, a fuller understanding of the invention may be obtained by referring to the summary of the invention, and the detailed description of the preferred embodiment, in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a fiber optic connector assembly for aligning and terminating at least one optical fiber of a fiber optic cable within the connector along a predetermined axis. In its preferred form, the assembly includes a rigid tubular body having a bore dimensioned for receiving the fiber optic cable, a central axis concentric with the predetermined axis and a compressible split alignment sleeve having an outer dimension greater in dimension than the bore of the rigid tubular body and a threaded alignment sleeve holder having a central aperture dimensioned for receiving the rigid tubular body and the compressible split alignment sleeve. The split alignment sleeve is adapted for the forced insertion into the central aperture of the alignment sleeve holder. This insertion correspondingly compresses and substantially reduces the outer dimension of the split alignment sleeve about the rigid tubular body to firmly grip the rigid tubular body thereby disposing the optical fiber along the predetermined axis.

More specifically, the apparatus provides a connector pin assembly for concentrically aligning and terminating at least one optical fiber of a fiber optic cable with respect to the outer dimension of a contact surface. The rigid cylindrical tubular body, has a rear end, a forward end, a first bore extending into the rear end dimensioned for receiving the cable, a narrowing of said first bore forming a tapering fiber tunnel, a second bore extending from the fiber tunnel into the terminal forward end communicating with the first bore via the tapering fiber tunnel and being concentric to the outer dimension of the terminal end.

The alignment sleeve is compressibly fit into the threaded alignment sleeve holder to position opposing forward ends of two opposing rigid tubular body assemblies along a predetermined axis. Once positioned, the assembly forms a connection between opposing fiber optic contacts and is held in place via the use of coupling nuts. C-rings maintain the coupling nuts in place on the rigid tubular bodies when the coupling nuts are not being used.

The apparatus further includes a compression pin which is inserted into the forward end of each respective cylindrical tubular body to concentrically align and separate fibers of the fiber optic cable. The insertion of the compression pin in conjunction with a specially constructed multi-fiber optic cable reduces the normal cable manufacturing tolerances to a minimum, thereby allowing the precision alignment between opposing fibers. In its preferred form, the multi-fiber optic cable includes a central optical fiber core having a set of concentrically arranged coverings that are of a compressible nature to facilitate the compressive removal of tolerances. An internal spine in the apparatus' preferred form is located in the forward end of each cylindrical tube respectively, and is used to maintain the position of the fibers within the forward end of each cylindrical tube. Each internal spline is positioned perpendicular to a female external key slot. More particularly, the female external key slot is located on the exterior of the rigid cylindrical tubular bodies, approximately midway along the length of the rigid tubular bodies. The perpendicular positioning of the internal spline with respect to the female external key slots, in conjunction with the mating of the slots with male keys located at both ends of the threaded alignment sleeve holder, ensure proper channel alignment between opposing optic fibers.

It is an object of this invention to provide an apparatus which overcomes the aforementioned inadequacies of the prior art devices and provides an improvement which is a significant contribution to the advancement of fiber optic connector and cable art.

Another object of this invention is to provide a fiber optic connector which aligns and terminates multiple fiber optic channels of a fiber optic cable along a preselected axis of a fiber optic cable.

It is a further object of the present invention to provide a connector pin assembly which concentrically aligns and terminates multiple fiber optic channels of a fiber optic cable with respect to the outer dimension of the connector.

It is yet another object of the present invention to provide a fiber optic connector which is readily adaptable for field termination of multiple fiber optic cables.

It is still a further object of the present invention to provide a new and improved fiber optic connector for aligning and terminating multiple fiber optic cables which may be utilized in a field environment where specialized termination equipment is not required.

Another object of the invention is to provide a connector which controls the joining and accurate alignment of small diameter cores of optical fibers in a manner which will minimize light transmission losses.

It is yet another object of the invention is to provide a connector which is easily manufactured and assembled while being cost effective, and that is practical for both military and commercial uses.

It is even a further objective to provide a multi-fiber single contact fiber optic connector that is small in size and light in weight thereby enhancing its desirability of use in space critical applications.

The foregoing summary of the invention outlines some of the more pertinent objects of the invention. The objects should be construed to be merely illustrative of some of the more prominent features and applications of the intended invention. Many other beneficial results can be obtained by applying the disclosed invention in a different manner or modifying the invention within the scope of the disclosure. The summary outlines rather broadly the more pertinent and important features of the present invention in order that the detailed description of the invention that follows may be better understood so that the present contribution to the art can be more fully appreciated.

Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Further objects and advantages of the present invention will become apparent as the following description of the preferred embodiment proceeds, taken into conjunction with the accompanying drawings in which:

FIG. 4b is an enlarged cross-sectional view of a second embodiment of the area indicated in circular phantom lines of FIG. 4.

FIG. 4c is a side elevational view of the modified compression pin used in the embodiment shown in FIG. 4b.

FIG. 4d is a cross-sectional taken along line 4d—4d of FIG. 4c.

FIG. 9 is a side elevation, partial cross section, partial elevation of a fourth embodiment of the single contact connector taken along line 9—9 of FIG. 10.

FIG. 10 is a left end view of FIG. 9.

Similar reference characters refer to similar parts throughout the several views of the drawings.

DRAWING REFERENCE NUMBERS

10  Multi-fiber, single contact fiber optic connector and cable apparatus.
11  Internal threads of 12.
12  Coupling nuts.
13  External threads of 14.
14  Threaded alignment sleeve holder.
15  Split alignment sleeve.
16  C-ring
18a-b  Rigid tubular body shell parts.
19  Thickened rigid tubular body shell part of fifth embodiment.
20  Knurled end of 18.
21  Slot in 15.
22  Recessed crimping indentation in 18.
23  Major diameter bore portion of 18.
24  Bore of 15.
25  Minor diameter bore portion of 18.
26  Abutment relief gap.
27  Bore of 14.
28  Thread relief gap.
29  Friction relief gap of 12.
30  Circular retention shoulder surface of 18.
31a-b  Fiber optic cable assembly.
32  Tapered fiber tunnel of 18.
33  Fiber optic cable jacket.
34  Cable strain relief gap.
35  Multi-fiber optic cable.
36  Cylindrical contact alignment barrel of 18.
37  Leading edge of 36.
38  Spherical tip of 40.
40  Compression pin.
41  Outside diameter of 40.
42  Internal fiber alignment spline.
43  Outside diameter of 31 before compression.
44  Male alignment key protuberance of 14.
45  Sides of 42
46  Chamfer of 42.
47  Inner diameter of 36.
48  Optic fiber.
50  Single contact mating point of opposing fibers.
52  Compression relief area.
54  Relief area for 42.
56  Female external alignment key slot of 18.
58  Key stop.
59  Front edge of 44
60  Recessed socket of 14.
62  Annular retention slot for 16.
64  Single strand fiber optic cable.
66  Small fiber optic cladding.
68  Center strength member.
70  Small fiber optic buffer for 48.
72  Crimping material of 35.
74  Compression surfaces of 110.
76  Compression relief gaps of third embodiment.
78  Hexagonal shaped crimp sleeve.
79  Major diameter bore portion of 19.

| Ref | Description |
|---|---|
| 80 | Hex coupling nut of 114. |
| 82 | Thread relief area of 114. |
| 83 | Entrance relief area of 114. |
| 84 | Rigid tubular body shell part of 114. |
| 85 | Rear end of 84. |
| 86 | Retention stops for 80. |
| 87 | Leading edge 87 of 84. |
| 88 | Circular retention shoulder of 84. |
| 90 | Threaded alignment eyelet holder of 114. |
| 91 | Internal threads of 80. |
| 92 | Tapered section of 84. |
| 97 | Internal fiber alignment spline of 84. |
| 98 | Female male alignment kerf for 102. |
| 99 | External threads of 90. |
| 100 | Alignment eyelet of 114. |
| 104 | Large fiber optic cladding for 64. |
| 106 | Large fiber optic buffer for 64. |
| 108 | Compression pin of second embodiment. |
| 109 | Fiber buffer compression relief area of 36a. |
| 110 | Cylindrical contact alignment barrel of 114. |
| 111 | Scalloped semicircular indentations of 110. |
| 112 | Compression pin of third embodiment. |
| 114 | Fourth embodiment of multi-fiber, single contact fiber optic connector. |

DETAILED DESCRIPTION OF THE PREFERRED EMBODIMENT

Figure 1:
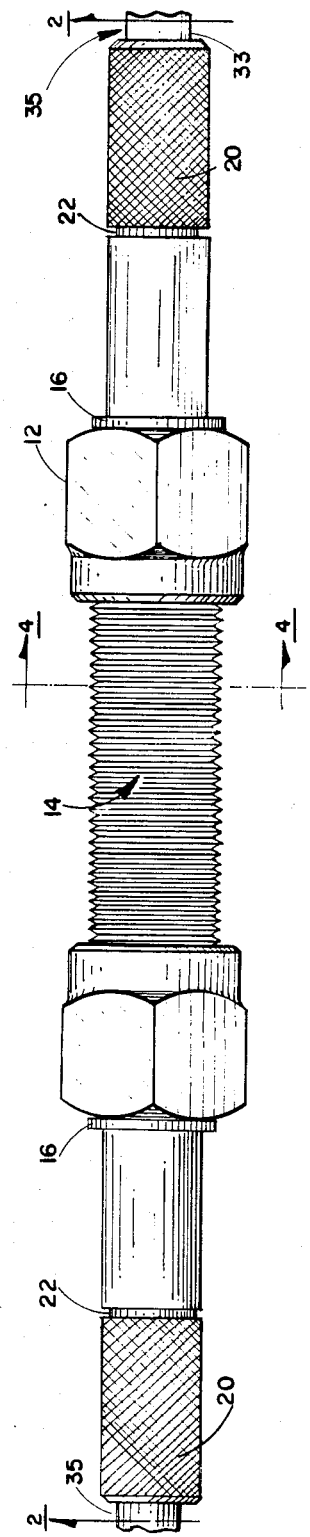
FIG. 1 is a top plan view of a preferred embodiment of the invention.
Figure 2:
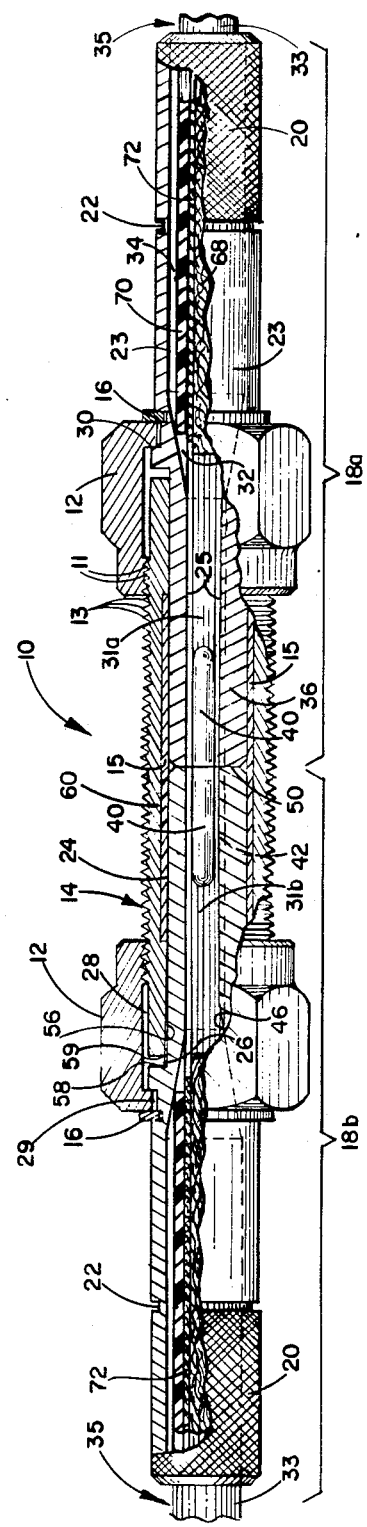
FIG. 2 is a side elevation, partial section, partial elevation, of a preferred embodiment of the invention taken along line 2—2 of FIG. 1.
Figure 3:
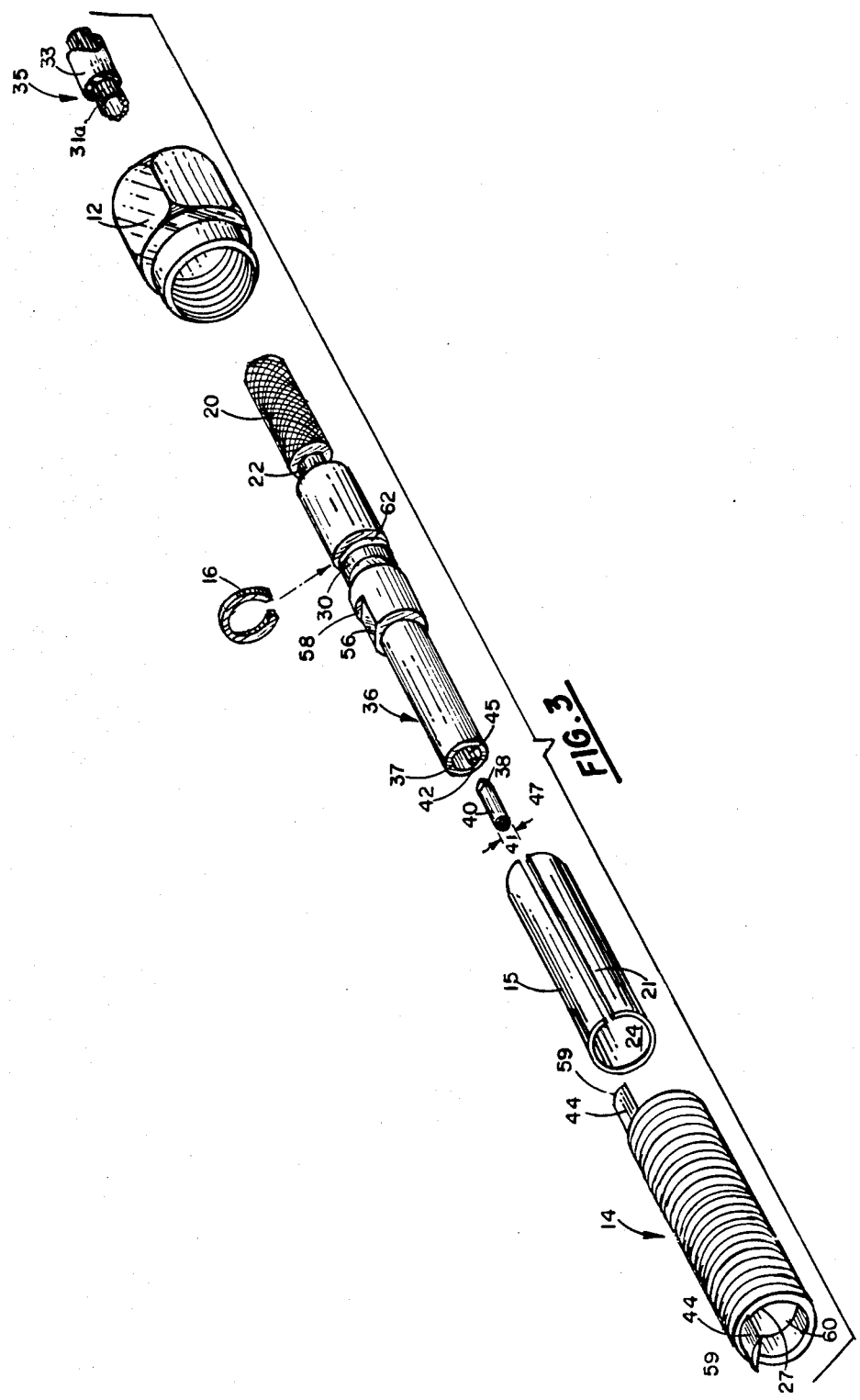
FIG. 3 is an exploded perspective view of the right hand side of a preferred embodiment of the invention along with related elements.

Referring now to the drawings, and particularly to FIGS. 1–3 thereof, there is shown a preferred embodiment of a complete fiber optic connector arrangement which includes two cables having multiple optical fibers which have been aligned and terminated within a connector pin assembly constructed in accordance with the present invention. The fiber optic connector of FIGS. 1–2, generally designated at 10, illustrate the main rigid tubular body shell parts 18a and 18b physically mated together. FIG. 3, is an exploded perspective view, depicting a single non-mated rigid tubular body shell part 18a and associated connecting parts. Because the respective rigid tubular body shell parts 18a and 18b are identical, the parts thereof will hereinafter be concurrently described with the same reference numerals used for identical parts. Additionally, the same reference numerals will be utilized throughout the drawings for descriptions of different embodiments where the structure of the parts is identical.

The connector 10 as illustrated in FIGS. 1–3, as most clearly shown in FIG. 2, includes a rigid tubular body shell parts 18a and 18b, a threaded alignment sleeve holder 14, coupling nuts 12, C-rings 16, compression pins 40, and a split alignment sleeve 15. The connector 10, as illustrated therein, terminates a multi-fiber optical cable 35. The parts and arrangement of multi-fiber optical cable 35 are described infra.

The rigid tubular body shell part 18a is generally cylindrical in shape having a rear knurled end 20 and a forward contact alignment barrel end 36. Between the knurled end 20 and alignment barrel end 36 there is a recessed crimping indentation 22, an annular retention slot 62 for a C-ring 16, a circular retention shoulder surface 30 and a female external alignment key slot 56. From inspection of FIGS. 1–3, it will be realized that the coupling nuts 12 and the C-rings 16 are essentially a part of the rigid tubular body shell parts 18a and 18b and serve to effect the intended connection by engagement of the internal threads 11 over the external threads 13, the latter being on the external perimeter of the threaded alignment sleeve holder 14. A thread relief gap 28 and a friction relief gap 29 are provided to reduce mechanical stresses created as a result of the coupling nuts 12 engagement of the internal threads 11 over the external threads 13.

The rigid tubular body shell parts 18a–18b, C-rings 16, split alignment sleeve 15, split alignment sleeve holder 14, and coupling nuts 12 are preferably constructed out of a strong spring metal or plastic material. Since there is no requirement for conductivity, a wide range of materials can be utilized, based on cost, ease of manufacture, and adaptability to environmental factors. For example, stainless steel, beryllium copper, and other like characteristic materials can provide the desired characteristics for the apparatus of the invention according to any of the embodiments or variations contemplated.

It will be evident from FIGS. 1–2 that the mating of the rigid tubular body shell parts 18a and 18b by the aforementioned thread engagement results from an inwardly directed thrust applied by the coupling nuts 12 against the circular retention shoulder surface 30. The C-rings 16 and the annular retention slot 62 coact to retain the coupling nuts 12 onto the rigid tubular shell parts 18a and 18b when the connector is in an unmated position. More specifically, the mating of the rigid tubular body shell parts 18a and 18b may be accomplished by the axial translation of the respective rigid tubular body shell parts 18a and 18b toward each other until the engagement of the threads 11 and 13 respectively can be effected.

Upon further inspection of FIG. 3, a recessed socket 60 in the threaded alignment sleeve holder 14 can be seen. This socket 60 is utilized to hold the split alignment sleeve 15 inside the threaded alignment sleeve holder 14.

The split alignment sleeve 15 has an outer diameter therein which is slightly smaller than the diameter of the bore 27 of the threaded alignment sleeve holder 14 when the sleeve 15 is in a compressed state. Further, the outer diameter of the cylindrical contact alignment barrel 36 is slightly larger than that of the bore 24 of the split alignment sleeve 15 when the sleeve 15 is in a relaxed state thereby allowing for a tight tolerance insertion of the cylindrical contact alignment barrel 36 into the bore 24 of the split alignment sleeve 15. The leading edge 37 of the cylindrical contact alignment barrel 36 may be chamfered in order to provide an easy entry of the alignment barrel 36 with the bore 24 of the split alignment sleeve 15.

The function of the alignment sleeve 15 is for the axial alignment of respective cylindrical contact alignment barrels 36 of the rigid tubular body shell parts 18a and 18b. This axial alignment is accomplished by the mechanical compressive force created by the tight tolerance insertion of the respective cylindrical contact alignment barrels 36 into the bore 24 of the split alignment sleeve 15. The slot 21 in the alignment sleeves enhances the ease of manufacture and secondly, the resilience of the material from which it is constructed provides a radially outward force when installed in socket 60. This outwardly directed force firmly holds the split alignment sleeve in position within the threaded alignment sleeve holder 14.

Referring to FIGS. 2 and 3 collectively, it is very important in the multi-channel single fiber optic connector and cable apparatus 10 that the optic fiber assemblies 31a be interconnected to the exact opposing optic fiber assemblies 31b in order to achieve the desired optical communication therebetween. This interconnection is accomplished via the interaction between two male alignment key protuberances 44 at each end of the threaded alignment sleeve 14 and the female external alignment key slots 56, in conjunction with the internal fiber alignment spline 42.

More particularly, the respective male alignment key protuberances 44 each have surfaces which are axially positioned to be aligned with the surfaces of corresponding female external alignment key slots 56 of the rigid tubular body shell parts 18a and 18b respectively. The internal fiber alignment spline 42 is positioned perpendicular to the surface of each respective female external alignment key slot 56 to further ensure proper channel alignment between opposing optic fiber assemblies 31. As the inwardly directed thrust is applied by the coupling nuts 12 against the circular retention shoulder surface 30, the male alignment key protuberances 44 position themselves with the female external alignment key slots 56. It is noted that abutment relief gap 26 (see FIG. 2) is provided so that the front edge 59 of each respective protuberance 44 will not come into contact with key stop face 58, when the respective rigid tubular body shell parts 18a and 18b are in their mated positions as shown in FIGS. 1 and 2. More specifically, the abutment relief gap 26 forces the leading edge 37 of the contact alignment barrel 36 of each respective shell part 18a and 18b to form the single contact mating point 50 (see FIG. 2) between opposing fiber optic assemblies 31a and 31b.

Referring now exclusively to FIG. 2, the rigid tubular body shell part 18a includes a major diameter bore portion 23 extending into the rear knurled end 20 dimensioned for receiving a multi-fiber optical cable 35, a narrowing of said first bore 23 in the form of a tapered fiber tunnel 32, a second minor diameter bore portion 25 extending from the tapered fiber tunnel 32 into the forward contact alignment barrel end 36 and communicating with the major diameter bore portion 23 via the tapered fiber tunnel 32 and being concentric to the outer diameter of the forward contact alignment barrel end 36.

Figure 5:
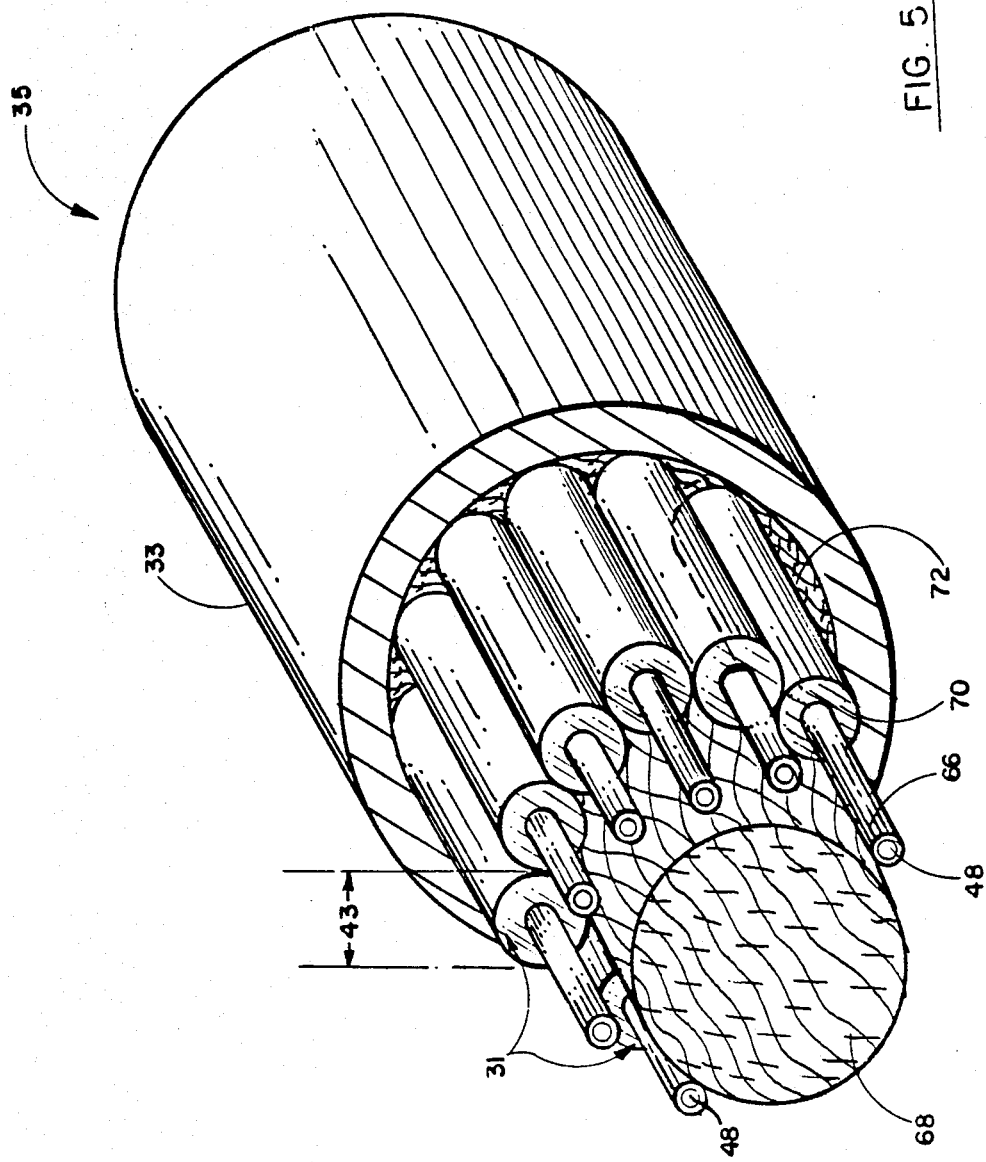
FIG. 5 is a cabinet view of a multi-fiber optical cable.

Turning now to FIG. 5, a cabinet view illustrating a preferred embodiment of the multi-fiber optical cable 35 is shown. The multi-fiber optic cable 35 includes, a center strength member 68, optic fibers 48, small fiber optic cladding 66, small fiber optic buffer 70, crimping material 72, and a fiber optic cable jacket 33. More particularly, the center strength member 68 is preferably made of a flexible material such as "KEVLAR" or "FIBERGLAS". "KEVLAR" is a registered trademark of the E. I. Du Pont de Nemours & Company, located in Wilmington, Del. The "KEVLAR" or "FIBERGLAS" material is woven into a cylindrical rope shaped center strength member 68 having a longitudinal axis. The center strength member 68 functions to control the positioning of the fiber optic cable assemblies 31 in a circular orientation around the center strength member 68. It also enhances the tensile strength of the multi-fiber optic cable 35, maintains a bend radius control of the multi-fiber optic cable 35 and serves to relieve the stress on the individual fiber optic cable assemblies 31 while the apparatus 10 and multi-fiber optic cable 35 are subjected to tensile loads. It is to be noted that a myriad of materials may be used for the construction of the center strength member 68 and still be within the subject matter contemplated by the instant invention. For example, hemp, cotton or steel wire may be substituted for the "FIBERGLAS" or "KEVLAR" construction of the center strength member depending on the particular application and environment that the apparatus 10 and the multi-fiber optic cable 35 will be subjected to.

Each respective optic fiber 48 is encased in a small fiber optic cladding 66. This cladding is in turn surrounded by a small fiber optic buffer 70. Each respective optic fiber 48 in conjunction with its small fiber optic cladding 66 and its small fiber optic buffer 70., comprises a single fiber optic cable assembly 31 having a longitudinal axis. The several optic fiber assemblies 31 are concentrically arranged around the center strength member 68 so that the longitudinal axis of each assembly 71 is parallel to the longitudinal axis of the strength member 68. The optic fibers 48 within the fiber optic cable assembly 31 are typically constructed out of an optically transparent material, most notably pure fused silica. The small fiber optic cladding 66 is preferably constructed from a hard material having a low index of refraction generally between the range of 1.40 to 1.44, that is also optically transparent. The material preferably used for this purpose is most often glass or plastic. The purposes of the small fiber optic cladding 66 is to provide a physical barrier between the optic fiber 48 and the external environment, to reduce optic signal losses, as well as to promote optic fiber 48 strength by eliminating cracks and water induced stress corrosion.

The fiber optic buffer 70 is typically constructed out of a material that displays resilient properties upon compression. Materials of this category are most notably "HYTRELL", nylon and silicon rubber. "HYTRELL" is a trademark of the E. I. Du Pont de Nemours & Company, located in Wilmington, Del. The fiber optic buffers 70 provide additional protection to the optic fiber 48 from external abuse and serve to eliminate manufacturing tolerances and to thereby position the individual optic fibers 48 around the center strength member 68 in accordance with the precepts of the apparatus 10.

The entire group of concentrically aligned fiber optic cable assemblies 31 is encircled by a threadlike crimping material 72 encased within a fiber optic cable jacket 33, and collectively comprises a multi-fiber optic cable 35. The crimping material 72 is preferably made from either "KEVLAR" or "FIBERGLAS" and serves to add additional tensile strength to the multi-fiber optic cable 35 as well as to aid in the attachment of the multi-fiber optic cable 35 to the rigid tubular body 18a or 18b respectively. The fiber optic cable jacket 33 is most preferably constructed from a flexible, waterproof plastic polymer material such as nylon or "TEFLON" The fiber optic cable jacket 33 as previously described serves to encase the fiber optic cable assemblies 31, thereby protecting said assemblies 31 from external environmental pollutants and physical damage.

The diameter of the fiber optic cable assembly 31 must be of a size so that an interference fit will exist between adjacent fiber optic cable assemblies 31 within the confines of the cylindrical contact alignment barrel 36 of the rigid tubular body shell part 18a. The term "interference fit" as used with respect to the instant invention refers to a packing condition whereby adjacent fiber optic assemblies 31 are compressed into an area slightly smaller than the sum of their respective diameters. More particularly, this slightly smaller area is the inner diameter 25 of the cylindrical alignment barrel 36. In the preferred embodiment twelve optical fibers 48, i.e., twelve fiber optic assemblies 31 are utilized. It is to be noted, however, that any number of fibers 48 could be utilized and still be in keeping with the spirit and scope of the instant disclosure.

Figure 4:
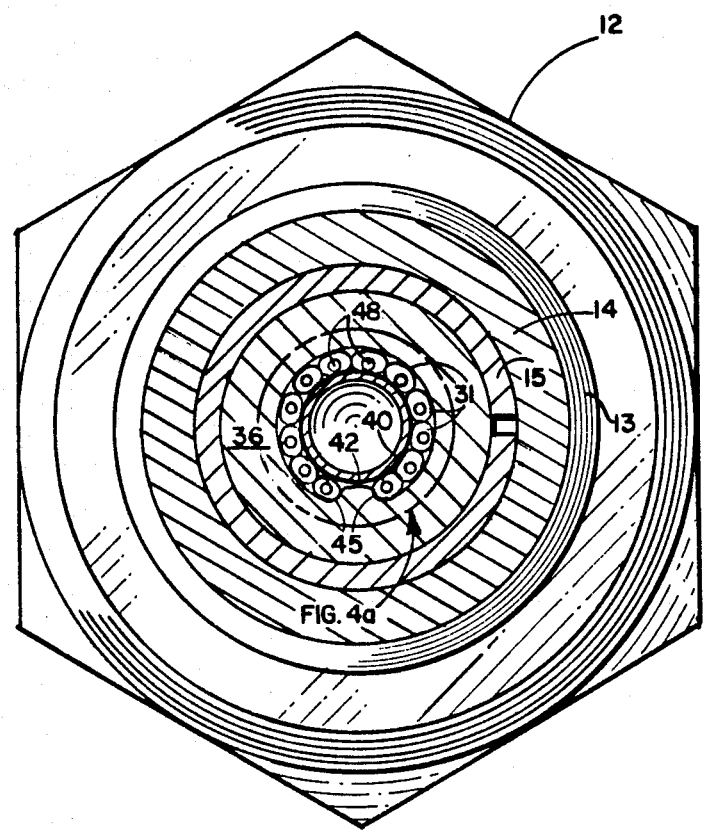
FIG. 4 is a cross section taken along line 4—4 of FIG. 1.

Referring now to FIG. 4, a cross section has been taken along line 4—4 of FIG. 1, illustrating the position of the optic fiber assemblies 31 that have been compressibly fit into the cylindrical contact alignment barrel 36 of the rigid tubular body connector shell 18a.

More specifically, referring to the central portion of FIG. 4, the compression pin 40 is shown with optic fiber assemblies 31 circularly aligned around the compression pin 40. The compression pin 40 creates an interference fit upon the insertion of its spherical tipped end 38 (end 38 shown in FIG. 3) into the center of the optic fiber assemblies 31 causing the optic fiber assemblies 31 to line up on the circumference of the compression pin 40 within the bore 25 of the member 36 and in fixed positions relative to alignment spline 42. The spherically tipped end 38 of the compression pin 40 prevents damage to the optic fibers 48 upon the insertion of the compression pin 40 into the center of the optic fiber assemblies 31. The novel structural and compositional makeup of the optic fiber assemblies 31 automatically reduces the manufacturing tolerances of the optic fiber assemblies 31 and functions to position the individual optic fibers 48 of rigid tubular body shell part 18a so that they can be optically interconnected with opposing fibers 48 of the rigid tubular body shell part 18b.

Figure 4A:
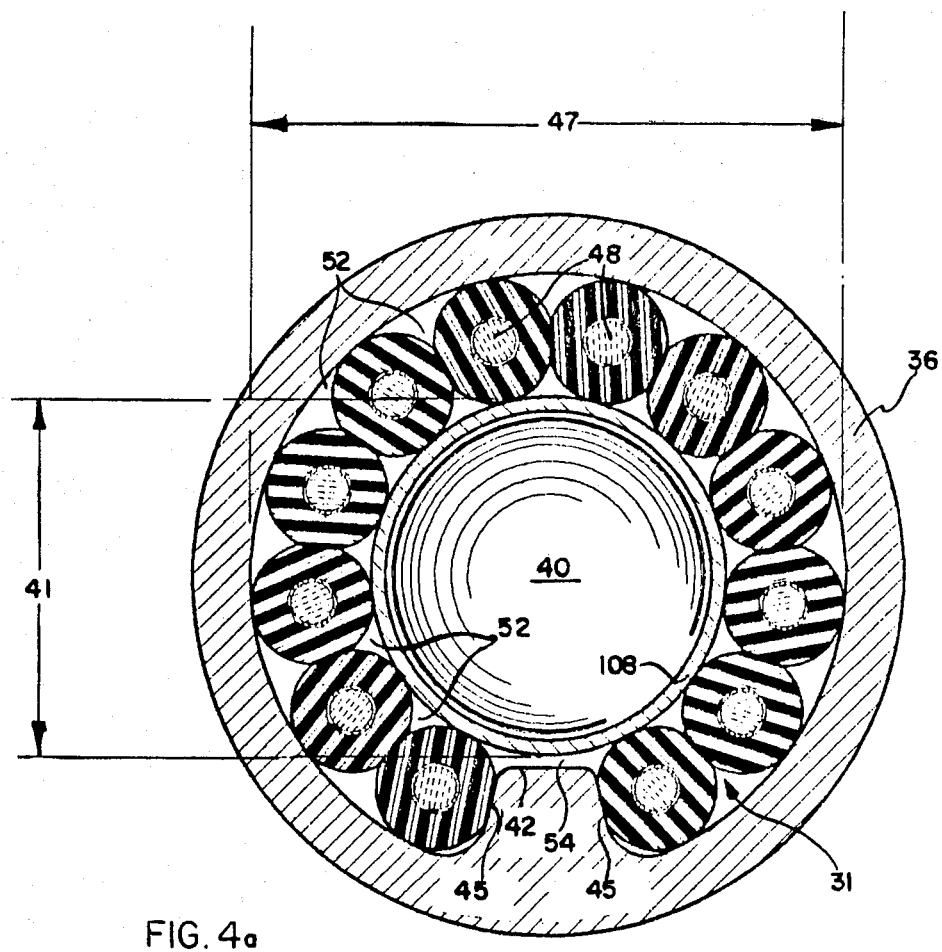
FIG. 4a is an enlarged cross sectional view of the area indicated in circular phantom lines of FIG. 4.

Stated otherwise and somewhat more specifically, this elimination of tolerances is accomplished by compressive forces as a result of a forced insertion of the compression pin 40 into the center of the fiber optic cable assemblies 31. Each fiber 48 has a specifically designed set of coverings indicated by reference numerals 66 and 70 as perhaps best shown in FIG. 5. However, even under the most controlled of manufacturing environments, these coverings 66 and 70 will have slight variations in diameter which are referred to as tolerances. It is desirable to reduce these tolerances to a minimum so that optical transmission efficiency can be maximized. This reduction of tolerances is accomplished by compressing and distorting those coverings 66 and 70 against the inner diameter of bore 25 of cylindrical contact alignment barrel 36, against the compression pin 40, against adjacent fiber optic buffers 70 and against the sides 45 of the internal fiber alignment spline 42, thereby creating somewhat of a distorted circular shape out of each one of the fiber optic cable assemblies 31. This distortion, as best shown in FIGS. 4-4a, reduces the tolerances associated with fiber alignment and does so automatically without the necessity of having to manually adjust one fiber optic cable assembly 31 with respect to the next.

This interference fit relationship is determined by the following novel structural formulas:

$$\frac{D}{d} = \frac{1}{\sin\left(\frac{180}{N+1}\right)} - 1 \quad X = (D + 2d) - T$$

Where:
D=outside diameter 41 of compression pin 40
d=outside diameter 43 of the fiber optic cable assembly 31 before compression
N+1=number of fibers 48 plus 1 (where 1 is a constant representing the fiber alignment spline 42)
X=inner diameter of the cylindrical alignment barrel 36
T=typical total manufacturing tolerance constant of an individual fiber 58 (normally 0.0102 cm)

The use of the above novel structural formulas allows for the construction of the apparatus 10 by starting with known values of certain parts and then algebraically solving for the unknown values of other parts. For example, if one starts with the outside diameter "d" of the fiber optic cable assembly 31 before compression, the total tolerance "T", and the number of fibers desired "N", the outside diameter "D" 41 (see FIG. 4a) of the compression pin 40 and the inner diameter "X" 47 (see FIG. 4a) of the bore 25 of cylindrical alignment barrel 36 can be determined algebraically.

Many similar examples are possible employing different known starting values in the above formulas to obtain the values for different unknowns. The utility of the formulas is its ability to further the repeatable construction of the apparatus 10. Furthermore, the above novel formulas allow for the heretofore unknown miniaturization of multi-channel optic fiber connectors, to a size of 3.81 cm in length and 0.635 cm in diameter.

FIG. 4a is an enlarged cross-sectional view of the area indicated in circular phantom lines on FIG. 4. In this figure, the cylindrical contact alignment barrel 36 and the arrangement of the fiber optic assemblies 31 within barrel 36 and around the compression pin 40 is shown in great detail. The alignment barrel 36 itself is circular in shape and includes an internal fiber alignment spline 42. The width of said internal fiber alignment spline 42 is preferably no greater and no less than the outside diameter 43 before compression (shown in FIG. 5) of a single fiber optic assembly 31, in order that the desired circular positioning of the fiber optic assemblies 31 is maintained within the bore 25 of alignment barrel 36.

Compression relief areas 52 as shown in FIG. 4a are formed upon insertion of the compression pin 40. Also shown, is the relief area 54 for the internal fiber alignment spline 42, which is required to insure that the compression pin 40 is not pushed to one side during its insertion into the center of the optic fiber assemblies 31 thereby preventing misalignment of fiber optic assemblies 31. As perhaps best depicted in FIG. 2 the internal fiber alignment spline 42 extends from the single contact mating point 50 located at the leading edge 37 (edge 37 best shown in FIG. 3) of the contact alignment barrel 36 to the narrow end 43 of the tapered fiber tunnel 32. The internal fiber alignment spline 42 is chamfered at the point where the tapered fiber tunnel 32 meets the second minor diameter portion 25 of the rigid tubular body shell part 18a. This chamfering 46 helps to prevent any damage to the fiber assemblies 31 upon their insertion into the respective rigid tubular body shell parts 18a and 18b respectively.

It should be appreciated that the diagrammatic representation as shown in FIG. 4a is merely illustrative of the many different combinations possible for the size, type and number of fiber optic cable assemblies 31 that may be used, and should not be construed as limiting the subject invention to the specific diagrammatic representation as shown and described. For example, an enlarged cross-sectional view of a second embodiment of the area indicated in the circular phantom lines of FIG. 4 is shown in FIG. 4b. In this second embodiment, upon an inspection of FIG. 4b it is immediately evident that the compression pin 40 of the principal embodiment as depicted in FIG. 4a has been fitted with a modified compression pin 108 and a large single strand fiber optic cable 64 along with associated large fiber optic cladding 104 and large fiber optic buffer 106. Essentially, the center strength member 68 of the multi-fiber optic cable 35 has been replaced with a single fiber optic assembly similar to 31, thereby increasing the available number of communication channels.

Turning now to FIGS. 4c-4d, a side elevational view and a cross-sectional view respectively of the modified compression pin that is used in the embodiment shown in FIG. 4b is illustrated. It is evident from an examination of FIGS. 4c-4d that the modified compression pin 108 comprises a hollow cylindrical tube without the spherical tip 38 of the preferred embodiment's compression pin 40. The spherical tip 38 is not desired in this embodiment so that the large single strand fiber optic cable 64 and its associated cladding 104 and buffer 106 can be inserted through the center of the modified compression pin 108 to increase the number of optical channels of the apparatus 10.

Figures 4E, 4F:
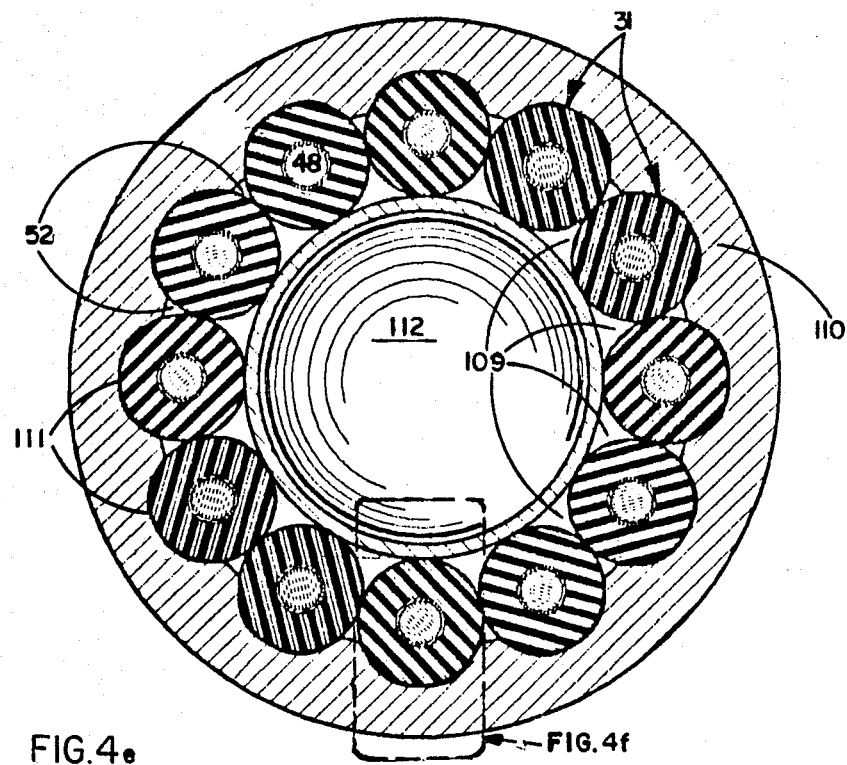
FIG. 4e is an alternate view of a third embodiment of the area indicated in circular phantom lines of FIG. 4.
FIG. 4f is an enlarged cross-sectional view of the area indicated in the phantom lines of FIG. 4e.
Figure 4F:
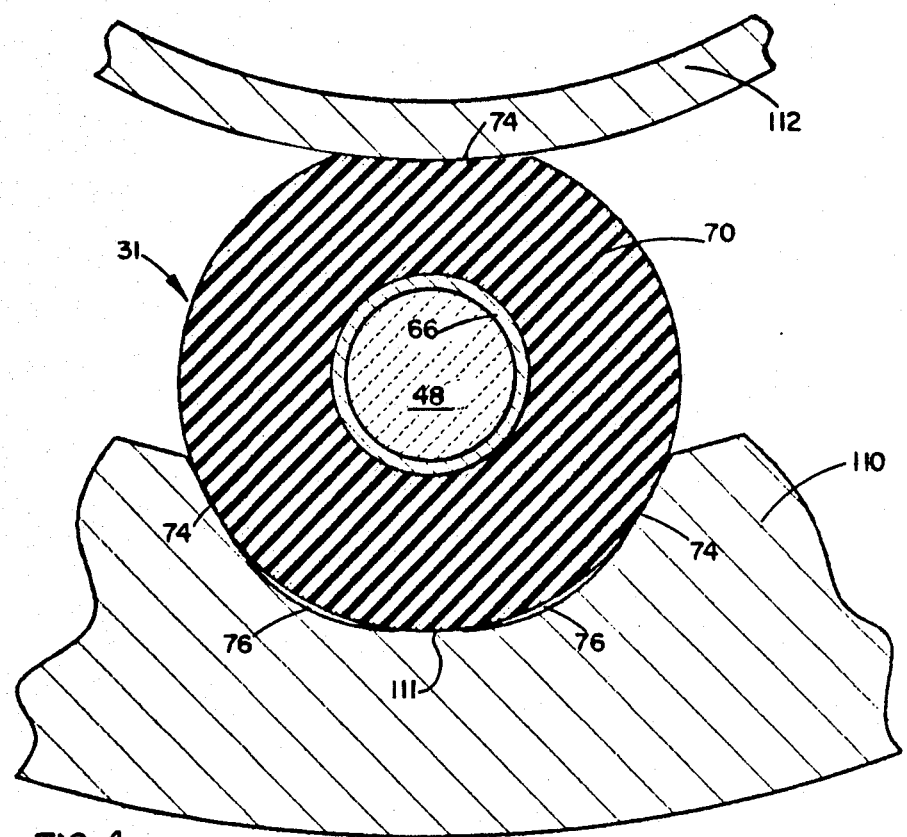

FIG. 4e is an alternate view of the third embodiment of the area indicated in circular phantom lines of FIG. 4. In this particular embodiment the cylindrical contact alignment barrel 36 of the first embodiment as shown in FIG. 4a has been modified to form a modified cylindrical contact alignment barrel 110. The modified cylindrical contact alignment barrel 110 has twelve scalloped semicircular indentations 111 equally spaced and extending longitudinally along the bore of barrel 110 which serve to positively maintain the fiber optic cable assemblies 31 in a fixed position with respect to the modified cylindrical contact alignment barrel 110. It is noted that the structure, composition and function of the fiber optic cable assemblies 31 is identical with that of the fiber optic cable assemblies of the preferred embodiment. Similarly, as with the preferred embodiment, it should be appreciated that the present invention is not to be limited to the use of twelve fiber optic cable assemblies 31, as shown and described. The third embodiment also includes a compression pin 112, which is identical in construction and function with the compression pin 40 of the preferred embodiment.

Referring now to FIG. 4f, an enlarged cross-sectional view of the area indicated in phantom lines of FIG. 4e is depicted. This enlarged illustration more clearly shows the positioning of a fiber optic cable assembly 31 within the modified cylindrical contact alignment barrel 110 of the third embodiment. More particularly, a scalloped semicircular indentation 111 is shown with a optic fiber cable assembly 31 resting therein with the compression pin 112 inserted. The fiber optic cable assembly 31 is shown as being compressed at surfaces 74 respectively. The compressive forces associated with the insertion of the compression pin 112 function in an identical fashion with the insertion of compression pins 40 and 110 of the preferred and second embodiments respectively. Namely, the fiber optic assembly 31 is compressed and distorted into a distorted circular shape. This distorted circular shape is exaggerated for illustration purposes in FIG. 4f. In the process of the compression, compression relief gaps 76 form between the modified cylindrical contact alignment barrel 110 and the small fiber optic buffer 70 of the fiber optic assembly 31.

Additional relief areas 109, as shown in FIG. 4e, are also formed during the insertion of the compression pin 112. The compression relief areas 109 and 76 (the relief areas 76 which are too small to be seen in FIG. 4e but are shown in the enlarged FIG. 4f) respectively function to reduce mechanical stresses on the individual fibers 48 while coincidentally reducing the normal tolerances associated with fiber optic alignment.

The keying of the modified cylindrical contact alignment barrel 110 to an opposing cylindrical contact alignment barrel 110 of the third embodiment is accomplished without the necessity of the use of the internal fiber alignment spline 42 of the first embodiment as best shown in FIG. 4a. The positioning of the scalloped semicircular indentations 41 in the cylindrical contact alignment barrel 110 are located in a precise position with respect to the female external alignment key slots 56 (see FIG. 3) of rigid tubular body shell parts 18a and 18b respectively.

FIG. 9 depicts a side elevation, partial cross section, partial elevation of a fourth embodiment of the single contact connector generally designated by reference numeral 114. The connector 114, as illustrated in FIG. 9, includes a rigid tubular body shell part 84, a threaded alignment eyelet holder 90, a coupling nut 80, and an alignment eyelet 100. The connector 114, terminates a multi-fiber optical cable 35 (cable 35 is shown in FIG. 5).

The rigid tubular body shell part 84 is generally cylindrical in shape having a rear end 85, a circular retention shoulder 88, a cylindrical contact alignment barrel 110, and a leading edge 87. The rigid tubular body shell part 84 further comprises, four equally spaced retention stops 86 that are essentially raised portions formed in the rigid tubular body shell part 84 itself that will flex so that the hex coupling nut 80 can easily be pushed over the retention stops 86 from the rear end 85 of the rigid tubular body 84 to the desired position along the rigid tubular body shell part 84 against the circular retention shoulder 88. The rigid tubular body shell part 84 is preferably constructed out of a material which is rigid and somewhat flexible in nature. For example, resilient plastics, or thinly formed metals such as spring steel, brass and/or stainless steel may be desirable. The use of these materials enables the rigid tubular body shell part 84 to be manufactured by well known extrusion and injection molding processes.

More particularly, the retention stops 86 which is constructed from the same material as the rigid tubular body shell part 84, correspondingly has a certain degree of flexibility so that when the hex coupling nut 80 is pressed into a contacting position with the retention stops 86 they will flex inwardly allowing the hex coupling nut 80 to pass over the retention stops 86 and once the hex nut 80 has passed over the retention stops 86 they will spring back into their unflexed position Once this has occurred the hex nut 80 will be retained in the desired position around the rigid tubular body 84, between the circular retention shoulder 88 and the retention stops 86. In this embodiment the retention stops 86 replace the C-ring 16 and the angular retention slot 62 of the preferred embodiment.

It is critical with this fourth embodiment as it was with the preferred embodiment that exact opposing optic fiber assemblies 31 (not shown in FIG. 9 for purposes of clarity, but shown in FIG. 2) be interconnected to the exact opposing optic fiber assemblies 31 of another connector 114 in order to achieve the desired optical communication therebetween. This is accomplished in the fourth embodiment via the novel interaction of the alignment eyelet 100 with the cylindrical contact alignment barrel 110 and the threaded alignment eyelet holder 90. The cylindrical contact alignment barrel 110 and the alignment eyelet 100 are constructed in such a fashion so as to eliminate the male alignment key protuberance 44, the female external alignment key slot 56, the key stops 58, of the preferred embodiment (as shown in FIG. 3).

Figure 11:
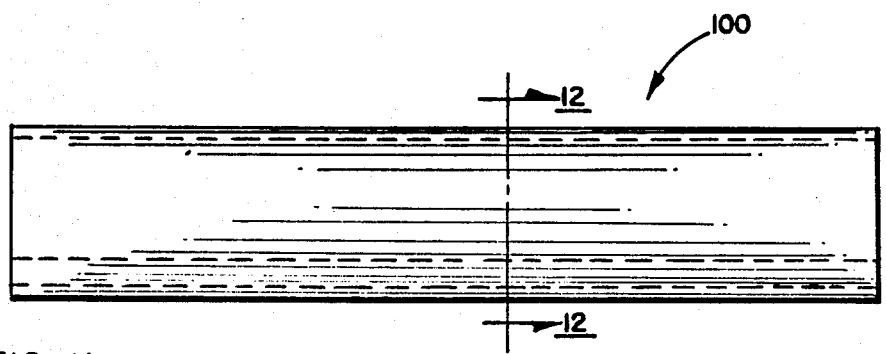
FIG. 11 is a side elevational view of the fifth embodiment's alignment eyelet.
Figure 12:
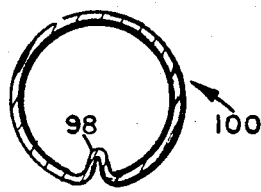
FIG. 12 is a cross sectional view taken along line 12—12 of FIG. 11.

More specifically, the cylindrical contact alignment barrel 110 has a male internal fiber alignment spline 97 that extends from the leading edge 87 of the rigid tubular body to the beginning of the tapered section 92. This male internal fiber alignment spline 97 is formed with an upwardly extending indentation that extends throughout its entire length. The purpose and function of this indentation is to engage a female alignment kerf 98 of the alignment eyelet 100. This female alignment kerf 98 and alignment eyelet 100 are best illustrated in FIGS. 11-12.

FIG. 10 is a left end view of FIG. 9, and illustrates the positioning of the internal fiber alignment spline 97 as it is engaged with the female alignment kerf 98. In this embodiment, as with the preferred embodiment, a multi-fiber optical cable 35 is used containing twelve optic fiber assemblies 31 which concentrically align themselves around the internal fiber alignment spline 97 when a compression pin 40 (pin 40 shown in FIG. 3) is inserted in the same manner described for the preferred embodiment. The function of the alignment eyelet 100 is for the axial alignment of the cylindrical contact alignment barrel 110 of the rigid tubular body shell part 84 to another like alignment barrel 110 of a second multi-fiber, single contact fiber optic connector 114 not shown.

Referring now to FIG. 9, the mating of the aforementioned tubular body shell part 84 with an opposing rigid tubular body shell part 84 is accomplished by the placement of the threaded alignment eyelet holder 90 over the alignment eyelet 100 which has been previously used to axially align two opposing connectors 114. The actual mating of the respective rigid tubular body shell parts 84 is the result of a thread engagement which is accomplished by the inwardly directed thrust applied by the coupling nuts 80 against the spherical retention shoulder 88. The engagement of internal threads 91 over the external threads 99, the later being on the external perimeter of the threaded alignment eyelet holder 90 serves to bring the two leading edges 87 of the connectors 114 together in a mated position. The thread relief area 82, as well as the entrance relief 83, provide stress relief during the intended engagement of opposing connectors 114.

The following description relates to the assembly of the multi-fiber optic cable 35 to the various embodiments of the apparatus 10. FIGS. 2 and 3 should be referred to throughout the following description. Generally, assembly of the rigid tubular body shell part 18a or 18b of the preferred embodiment to a multi-fiber optic cable 35, requires approximately an inch of the fiber optic cable jacket 33 to be removed to expose the fiber optic cable assemblies 31, the crimping material 72, and the center strength member 68. The center strength member 68 is further cut at a convenient length to accommodate the termination of the fiber optic assemblies 31.

Adhesive is then inserted into the rigid tubular body 18a, and placed on and around the fiber optic cable assemblies 31 of the multi-fiber optic cable 35. The adhesive covered fiber optic cable assemblies 31 are then inserted through the knurled end 20 into the major diameter bore portion 23 of the rigid tubular body shell part 18a until the fiber optic cable assemblies 31 protrude outwardly from the leading edge 37 of the cylindrical contact alignment barrel 36. Once the fiber optic cable assemblies 31 are properly inserted within the rigid tubular body shell part 18a, as shown in FIG. 2, it can be seen that the center strength member 68, the fiber optic cable jacket 33, and the crimping material 72 (material 72 not shown in FIG. 2 but shown in FIG. 5) extends approximately midway into the tapered fiber tunnel 32. The exact lengths of the center strength member 68, the fiber optic cable jacket 33 and the crimping material 72 are not critical to the operation of the present invention. Moreover, the lengths of the cut parts 68, 33 and 72 may vary rather significantly with respect to each other within the confines of the tapered fiber tunnel 32. Since the diameter of tapered fiber tunnel 32 is larger than that of the total number of fiber optic cable assemblies 31, the optic fiber assemblies 31 may be readily inserted thereinto so that the fibers 48 in the fiber optic cable assemblies 31 will not catch on the internal alignment spline 42 and break. The tapered fiber tunnel 32 also serves to guide the fiber optic cable assemblies 31 into the smaller cylindrical contact bore 25 of alignment barrel 36. Once the optic fiber assemblies 31 have been inserted, a cable strain relief gap 34 is formed between the small fiber optic buffer 70 and the rigid tubular body parts 18a and 18b respectively. This gap 31 functions to relieve mechanical stresses on the cable and connector assembly during use.

The final steps of assembly call for the insertion of the compression pin 40 and epoxy/resin adhesive into the center of the protruding fiber optic cable assemblies 31 located in the cylindrical contact bore 25 of alignment barrel 36.

The compression pin 40 is in its proper position when it is inserted within the cylindrical contact alignment barrel 36 to a point such that the open ended end 47 of the compression pin 40 is flush with the leading edge 37 of the cylindrical contact alignment barrel 36. At this stage of assembly the adhesive is allowed to harden. The epoxy or resin type adhesive serves to fixedly position the optic fiber assemblies in their desired positions within the cylindrical contact alignment barrel 36 with respect to the internal fiber alignment spline 42 along the perimeter of the compression pin 40. The adhesive which is introduced into the vicinity of the leading edge 37 of the cylindrical contact alignment barrel 36 also provides relief from axial tolerances and reduces the hazard of mechanical damage to the optic fibers 48. Once the adhesive has hardened, the protruding fiber optic cable assemblies 31 are cut and then polished by any number of means including sand paper to be perfectly flush with the leading edge 37 of the contact alignment barrel 36.

Figure 6:
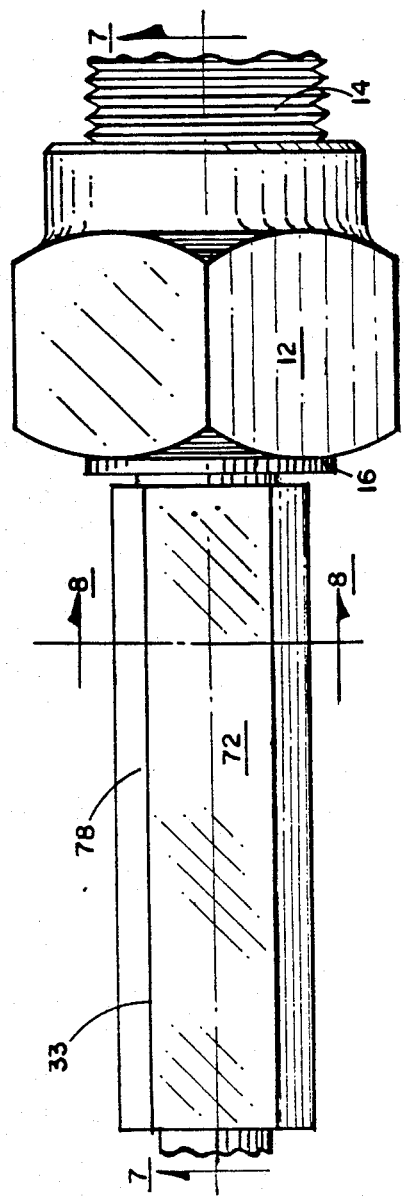
FIG. 6 is a top plan view of a variation of the preferred embodiment of the invention, showing a hexagonal shaped crimp sleeve.
Figure 8:
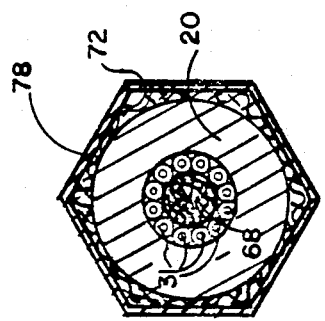
FIG. 8 is a cross sectional view taken along line 8—8 of FIG. 6.
Figure 7:
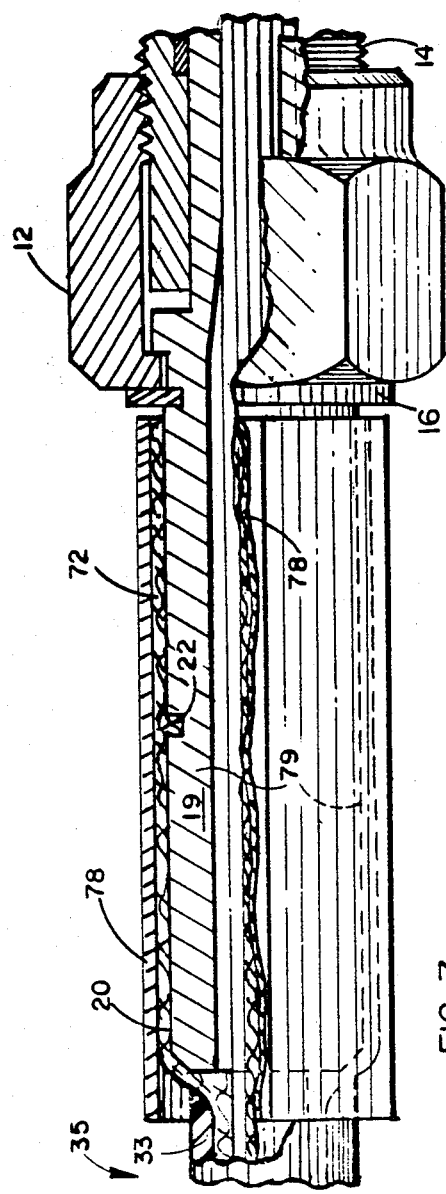
FIG. 7 is a cross section taken along lines 7—7 of FIG. 6 and is a side elevation, partial section, partial elevation.

A variation or fifth embodiment of the preferred embodiment of the invention, enabling another method of attachment of the multi-fiber optic cable 35 to the rigid tubular body shell part 18a is illustrated in FIGS. 6-8. More exactly, the fifth embodiment includes the reduction of the major diameter bore portion 23 of the rigid tubular body 18a of the principal embodiment. This reduction in diameter is accomplished by increasing the wall dimensions of the rigid tubular body 18a. For purposes of clarity, the modified rigid tubular body shell part and the major diameter bore portion of rigid tubular body shell part of the fifth embodiment will hereinafter be referred to by reference numerals 19 and 79 respectively.

The reduction in diameter of rigid tubular body shell 18a of the preferred embodiment functions to inhibit the passage of the fiber optic cable jacket 33 as well as that of the crimping material 72 from extending into the rigid tubular body 19. As with the assembly of the multi-fiber optic cable 35 in the preferred embodiment, approximately an inch of the fiber optic cable jacket 33 is removed to expose the fiber optic cable assemblies 31, the crimping materials 72 and the center strength member 68. Also as before, the center strength member 68 is further cut at a convenient length to accommodate the termination of the fiber optic assemblies 31.

The fiber optic cable assemblies 31 are then inserted through the knurled end 20 into the major diameter bore portion of the rigid tubular body shell part 19 until the fiber optic cable assemblies 31 protrude outwardly from the leading edge 37 (as shown in FIG. 3) of the cylindrical contact alignment barrel 36 (also shown in FIG. 3). In this fifth variation of the preferred embodiment once the fiber optic cable assemblies 31 are properly inserted within the rigid tubular body shell part 19, as shown in FIG. 7, it can be seen that the fiber optic cable jacket 33 does not protrude into the major diameter bore portion 79 of the rigid tubular body shell part 19 due to the bore's 79 smaller diameter.

Crimping material 72 is placed on the outside surface of the knurled end 20 all the way to the C-ring 16. The crimping indentation 22 facilitates a bunching up of the crimping material 72 and enhances the attachment of the crimping material to the rigid tubular body 19. In the preferred embodiment the crimping indentation 22 is solely ornamental in function. A circular crimp sleeve 78 having an internal bore of a diameter greater than that of the external diameter of the knurled end 20 is positioned over the crimping material 72 to a point abutting with the C-ring 16. Once the crimp sleeve 78 is properly positioned it is crimped via a pliers or similar device to compressively attach the multi-fiber optic cable 35 to the rigid tubular body shell part 14.

As depicted in FIG. 8, a cross sectional view has been taken along line 8—8 of FIG. 6 illustrating the crimp sleeve 78 as it has been crimped into a hexagonal shape around the crimping material 72 against the knurled end 20 of the rigid tubular body shell part 19. It is to be noted that the crimp sleeve 78 is not normally hexagonal in shape before crimping but rather is of a cylindrical shape.

Finally, it is also to be mentioned that in this fifth embodiment, the method of attachment of the multi-fiber optic cable 35 to the rigid tubular body shell part 19 is mechanical in nature and does not require the use of adhesive. As a result of the mechanical attachment, the protruding fiber optic cable assemblies 31 need only to be cut, no polishing is necessary as was the case with the preferred embodiment.

Although the invention has been described with respect to several particular embodiments, there are many other variations and modifications that may be implemented in accordance with the teachings of the present invention. By way of example, in lieu of the particularly configured cylindrical arrangement of the multiple fibers forming the fiber optic cable, any arrangement of a plurality of optical fibers collected individually or as a group in a single or multiple cables could be terminated and connected according to the present teachings. The plurality of fibers need only be received in a termination assembly such that the ends are disposed in a predetermined configuration with respect to a reference position. The termination assemblies may thereafter be interconnected to align and mate individual fibers in one termination assembly with individual fibers in a second termination assembly to allow optical coupling between fibers.

As previously noted, each termination assembly may receive individual fibers from a variety of sources or directions or a plurality of fibers from a multiple fiber bundle or cable. In addition, the fibers may be of the type described herein with protective claddings and coverings or individual fibers disposed in the termination assembly in the noted predetermined configuration. Furthermore, the fibers may be formed of the materials indicated or be of any other material capable of transmitting light through the fiber as described.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described what is claimed is:

1. An apparatus for aligning and terminating more than one optical fiber, having a compressible cover, of a first fiber optic cable to more than one optical fiber, having a compressible cover, of a second fiber optic cable along a predetermined axis comprising:

first and second mateable rigid tubular body parts each respectively having an exterior surface and a cylindrical interior surface constructed to receive a first and a second fiber optic cable;

a compressible split alignment sleeve having an inner diameter less than the diameter of said exterior surface;

a threaded alignment sleeve holder having two ends and a central aperture dimensioned for receiving said compressible split alignment sleeve, said compressible split alignment sleeve being adapted for a forced insertion into said threaded alignment sleeve holder to firmly grip said first and second rigid tubular body parts to dispose optical fibers each respectively having a compressible cover, along said predetermined axis upon receipt of said first and said second mateable rigid tubular body parts within said compressible split alignment as held by said sleeve holder;

means for mechanically securing said first and said second rigid tubular body parts together; and means for concentrically aligning more than one said optical fiber of said first fiber optic cable to more than one said optical fiber of said second fiber optic cable, said means for concentrically aligning including a compression pin constructed and arranged so as to engage said optical fibers to create an interference contact between each of said optical fibers, an interference contact between said compression pin and said fibers and interference contact between each of said fibers and said respective rigid tubular body parts.

2. The apparatus as set forth in claim 1, wherein said first and said second mateable rigid tubular body parts each respectively further comprise:
- a rear end;
- a terminal forward end;
- a first bore extending into said rear end dimensioned for receiving said first and said second fiber optic cables and having a center axis in common with said predetermined axis;
- a fiber tunnel having a wide end and a narrow end formed from a tapering of said first bore towards said forward terminal end; and
- a second bore having an inner diameter extending from said narrow end of said fiber tunnel bore into said terminal forward end communicating with said first bore via said fiber tunnel and being concentric to said terminal forward end.

3. The apparatus as set forth in claim 2, wherein said first and said second mateable rigid tubular body parts each respectively further comprise:
- an internal fiber alignment spline extending from said terminal forward end to said narrow end of said fiber tunnel;
- a female external key slot positioned on said exterior surface of said first and said second rigid tubular body parts and being perpendicularly aligned with respect to said internal spline.

4. The apparatus as set forth in claim 3, wherein said mechanical securing means comprises:
- a circular retention shoulder surface positioned midway along the exterior surface of said first and said second mateable rigid tubular body parts respectively;
- a set of coupling nuts having internal threads for engagement with external threads of said threaded alignment sleeve holder, said coupling nuts being positioned around said first and said second mateable rigid tubular body parts respectively and abutting to said circular retention shoulder surface;
- an annular retention slot positioned behind said coupling nut upon said exterior surface of said first and said second mateable rigid tubular body parts respectively; and
- a C-ring positioned in said annular retention slots for maintaining said coupling nuts in place on said exterior surface of said first and said second mateable rigid tubular body parts respectively.

5. The apparatus as set forth in claim 4, wherein said means for concentrically aligning, further comprises:
- a male alignment protuberance located on each said end of said threaded alignment sleeve holder that engages said female external key slots when an inwardly directed thrust is applied by said coupling nuts against said circular retention shoulder surface;
- a front edge located on each said male alignment protuberance; and
- a key stop surface positioned on said first and said second rigid tubular body for controlling the movement of said front edge of said protuberance thereby forming a positive contact mating point between said first and said second rigid tubular body parts.

6. The apparatus as set forth in claim 5, wherein said interference fit is maintained by the following structural relationships:

$$\frac{D}{d} = \frac{1}{\sin\left(\frac{180}{N+1}\right)} - 1 \quad X = (D + 2d) - T$$

wherein
- D = said outside diameter of said compression pin,
- d = said combined outside diameter of said optic fiber and said compressible cover before said insertion of said compression pin
- N+1 = said outside diameter of said cover and said optical fiber +1, (where 1 is a constant representing said internal fiber alignment spline)
- X = said internal diameter of said second bore
- T = typical total manufacturing tolerance constant of said optic fiber.

7. The apparatus as set forth in claim 5, in which said compression pin comprises a hollow cylindrical tube.

8. The apparatus as set forth in claim 5, wherein said compression pin creates an interference fit when inserted into said terminal end of said first and second rigid tubular body parts in between said compressible coverings of said optical fibers, and between said cylindrical interior surface of said first and said second rigid tubular body parts respectfully.

9. The apparatus of claim 3 in which said internal fiber alignment spline is chamfered at said narrow end of said fiber tunnel to facilitate the insertion of said optic fibers having compressible covers thereon.

10. The apparatus as set forth in claim 2, in which said rear end is generally knurled.

11. The apparatus as set forth in claim 2, in which said terminal forward end of said first and said second mateable rigid tubular body parts each respectively includes at least one scalloped, semicircular indentation which functions in conjunction with said compression pin to positively receive and maintain at least one of said optical fibers having a compressible cover thereon in a fixed position within said terminal forward end.

12. The apparatus as set forth in claim 1, wherein said compressible cover comprises:
- a fiber optic cladding concentrically surrounding each said optic fiber and generally constructed from materials selected from a group having a low index of refraction comprising glass and plastic; and
- a fiber optic buffer concentrically surrounding said fiber optic cladding, generally constructed from a group that displays resilient properties upon compression comprising nylon and silicon rubber.

13. The apparatus as set forth in claim 1, in which said threaded alignment sleeve holder further comprises an internal, recessed circular socket which receives said split alignment sleeve to retain it within said treaded alignment sleeve holder.

14. An optical communication system comprising in combination:
- a multi-fiber optic cable having more than one optical fiber;
- a compressible covering surrounding each of said optic fibers in said multi-fiber optic cable;
- a crimping material surrounding said plurality of said compressibly covered optic fibers;
- an outer jacket surrounding said crimping material;
- a connector; and
- a means for concentrically aligning said multi-fiber optic cable within said connector, said means for concentrically aligning including a compression member constructed and arranged so as to create an interference contact between each of said covered fibers, to create an interference fit between said compression member and said compressible covering on each of said fibers and an interference fit between said compressible coverings on each of said fibers and said connector.

15. An apparatus as set forth in claim 14 wherein said compressible covering further comprises:
   a fiber optic cladding surrounding said optic fiber; and
   a compressible fiber optic buffer surrounding said fiber optic cladding.

16. The apparatus as set forth in claim 14, wherein said connector comprises:
   first and second mateable rigid tubular body parts each respectively having an external surface and cylindrical interior surface receiving one of said first and second fiber optic cables;
   a compressible split alignment sleeve having an inner diameter less in dimension than a diameter of said exterior surface; and
   a threaded alignment sleeve holder having two ends and a central aperture dimension for receiving said compressible split alignment sleeve, said compressible split alignment sleeve being adapted for a forced insertion into said threaded alignment sleeve holder to firmly grip said first and said second rigid tubular body parts to dispose said optical fibers, having said compressible covering along said predetermined axis upon receipt of said first and said second mateable rigid tubular body parts within said compressible split alignment sleeve as held by said alignment sleeve holder.

17. The apparatus as set forth in claim 16, wherein said first and said second mateable rigid tubular body parts each respectively further comprise:
   a rear end;
   a terminal forward end;
   a first forward end extending into said rear end dimension for receiving said first and said second fiber optic cables having a center axis in common with said predetermined axis;
   a fiber tunnel having a wide end and a narrow end formed from the tapering of said first bore toward said terminal forward end; and
   a second bore having an inner diameter extending from said narrow end of said end of said fiber tunnel bore into said terminal forward end communicating with said first bore via said fiber tunnel and being concentric to said terminal forward end.

18. The apparatus as set forth in claim 17, wherein said first and said second mateable rigid tubular body parts each respectively further comprise:
   an internal fiber alignment spline extending from said terminal forward end to said narrow end of said fiber tunnel; and
   a female external key slot positioned on said exterior surface of said first and said second rigid tubular body parts and being perpendicularly aligned with respect to said internal spline.

19. The apparatus as set forth in claim 18, in which said internal fiber alignment spline is chamfered at said narrow end of said fiber tunnel to facilitate the insertion of said optic fibers having said compressible covering.

20. The apparatus as set forth in claim 18 in which said apparatus further comprises a means for mechanically securing said first and said second rigid tubular body parts together.

21. The apparatus as set forth in claim 20 wherein said mechanical securing means comprises:
   a circular retention shoulder surface positioned midway along the exterior surface of said first and said second mateable rigid tubular body parts respectively;
   a set of coupling nuts having internal threads for engagement with external threads of said threaded alignment sleeve holder, said coupling nuts being positioned around said first and said second mateable rigid tubular body parts respectively and abutting to said circular retention shoulder surface;
   an annular retention slot positioned just behind said coupling nut upon said exterior surface of said first and said second mateable rigid tubular body parts respectively; and
   a C-ring which fits into said annular retention slots for maintaining said coupling nuts in place on said exterior surface of said first and said second mateable rigid tubular body parts respectively.

22. The apparatus as set forth in claim 21, wherein said means for concentrically aligning, further comprises:
   a male alignment protuberance located on each said end of said threaded alignment sleeve holder that engages said female external key slots when an inwardly directed thrust is applied by said coupling nuts against said circular retention shoulder surface;
   a front edge located on each said male alignment protuberance; and
   a key stop surface positioned on said first and said second rigid tubular body for controlling the movement of said front edge of said protuberance thereby forming a positive contact mating point between said first and said second rigid tubular bodies.

23. The apparatus as set forth in claim 22, in which said compression member further comprises a spherically tipped end to prevent damage to said optical fibers upon said compression member's insertion of said tipped end into said terminal forward end of said first and said second rigid tubular body parts respectively.

24. The apparatus as set forth in claim 17, in which said rear end is generally knurled.

25. The apparatus as set forth in claim 17, in which said terminal forward end of said first and said second mateable rigid tubular body parts each respectively includes at least one scalloped, semicircular indentation which functions to positively receive and maintain at least one of said optical fibers, having said compressible covering in a fixed position within said terminal forward end.

26. The apparatus as set forth in claim 17, wherein said first and said second mateable rigid tubular body parts comprise;
   at least one flexible retention stop positioned on said rear end; and
   a male internal fiber alignment spline extending from said terminal forward end to said narrow end of said fiber tunnel.

27. The apparatus as set forth in claim 26, wherein said male fiber alignment spline functions to engage a threaded alignment eyelet having a female alignment kerf.

28. The apparatus as set forth in claim 17, in which said first bore is narrowed to preclude the entrance of a multi-fiber optic cable having an outer jacket.

29. The apparatus as set forth in claim 16, in which said threaded alignment sleeve holder further comprises an internal, recessed circular socket which receives said split alignment sleeve to retain it within said threaded alignment sleeve holder.

30. A method of interconnecting a plurality of optical fibers comprising:

receiving a first plurality of optical fibers each having a compressible cover on said fiber's end portions allowing optical coupling;

forcefully engaging said first plurality of optical fibers by the insertion of a compression pin in between said covered end portions, thereby causing the disposition of said covered end portions in a first predetermined configuration with respect to a first reference position;

receiving a second plurality of optical fibers each having a compressible cover on said fiber's end portion allowing the optical coupling;

forcefully engaging each of said second plurality of optical fibers by the insertion of a compression pin in between said covered end portions thereby causing the disposition of said covered end portions of said second plurality of optical fibers in a second predetermined configuration with respect to a second reference position; and interconnecting said first predetermined configuration of optical fibers with said second configuration of optical fibers using said first and second reference positions in such a manner that said covered end portion of at least one optical fiber of said first predetermined configuration is aligned and optically coupled to said covered end portion of at least one optical fiber of said second predetermined configuration.

* * * * *